United States Patent [19]

Dixon

[11] Patent Number: 4,888,879
[45] Date of Patent: Dec. 26, 1989

[54] ELECTRICAL JUNCTION BOX INSTALLER

[76] Inventor: Rodney G. Dixon, Rte. 1, Box 121M, Strafford, Mo. 65757

[21] Appl. No.: 170,840

[22] Filed: Mar. 21, 1988

[51] Int. Cl.⁴ ............................................. B25B 21/20
[52] U.S. Cl. ..................................... 33/613; 269/904; 33/DIG. 10
[58] Field of Search ................. 33/613, 528, DIG. 10; 269/904, 6, 3

[56] References Cited

U.S. PATENT DOCUMENTS

| | | | |
|---|---|---|---|
| 2,956,798 | 10/1960 | Briggs | 269/904 X |
| 2,962,281 | 11/1960 | Hodgson | 33/DIG. 10 |
| 2,990,172 | 6/1961 | Gianotta | 33/DIG. 10 |
| 3,954,717 | 5/1976 | Tarr | 269/904 X |
| 4,181,255 | 1/1980 | Duffy | 299/904 X |

Primary Examiner—Harry N. Haroian
Attorney, Agent, or Firm—Litman, McMahon & Brown

[57] ABSTRACT

A positioning device for the uniform positioning of electrical outlet boxes on wall studs during building construction includes a positioning block with a handle and adjustable positioning plates with a vertical guide. The positioning block is held at a preadjusted height by the vertical guide and is shaped to abut flush against a wall stud for proper alignment of the electrical junction box in view of a preadjusted depth associated with the positioning plates. In particular, the positioning plates are variably connected to each side of the positioning block to allow selective variation of the horizontal position of the electrical junction box relative to the face of a wall to be later installed on the stud framework. The depth of the box relative to the later to be installed wall is variably adjustable to allow for different thicknesses of wall cover. Attached to each positioning plate are spring loaded electrical junction box securing bands for holding the electrical junction box in proper alignment during positioning on the wall stud.

11 Claims, 2 Drawing Sheets

ELECTRICAL JUNCTION BOX INSTALLER

BACKGROUND OF THE INVENTION

1. Field of the Invention

The present invention relates generally to devices used to quickly position electrical junction boxes on wall studs prior to wall cover installation during building construction and hold such boxes in proper position while being secured to a stud.

2. Description of the Prior Art

Electrical junction boxes are used in building construction to provide enclosed junctions for electrical power outlets, switches and the like and are conventionally permanently installed on the stud walls of a space in a building under construction. Typically, the electrical junction boxes are designed to allow electrical power wires passing through the walls to connect with a structure mounted in or on a wall. For example, electrical junction boxes are designed to provide a rigid and stationary housing for electrical junctions such as where electrical receptacles, control switches, and the like which, are connected to electrical wires and where there is normally exposed some uninsulated or dangerous circuit wiring at the connections.

To maintain a durable, stationary, and safe space in the wall for housing electrical junctions, most modern electrical codes require electrical junction boxes of the type described herein and such boxes are typically securely fastened to a wall stud in the wall prior to installing a wall surface during construction. Furthermore, local ordinances may require a uniform vertical positioning of the electrical outlet boxes on wall studs relative to the floor, although it is best to have such a uniform positioning for aesthetic purposes even if not required.

In order to provide such a uniform vertical spacing, construction workers conventionally must take time to measure and mark on each stud the proper location for the electrical junction box. In addition, under conventional construction techniques, the electrical junction box has to be manually held in position without any means to prevent sliding on a relatively smooth stud, while attempting to pound anchoring nails that are inserted through slots in the electrical junction box into the stud. Although the boxes are normally marked or etched along stud facing surfaces to provide the electrician installing the box with guidelines to indicate varying depths or horizontal positioning so as to allow the electrician to position the box for the thickness of the wall covering being used (for example, $\frac{1}{2}''$ (gypsum board), there is normally nothing stable backing the box to prevent horizontal or vertical sliding along the stud, when the electrician is driving the nails and this often results in the face of the box being installed at an angle with respect to vertical or at an incorrect depth.

Alternatively, the electrician may take great pains to ensure the box is correctly aligned while driving the nails, but this results in substantially more time being required to complete the job. In any event, the prior construction procedures either result in inaccurate box positioning or require substantial additional time for careful measurement and often results in nonuniformly positioned electrical outlet boxes. If the position is too inaccurate or the box is too tilted, additional time must be devoted to the removal and reinstallation of the electrical outlet box at a proper position.

SUMMARY OF THE INVENTION

In the practice of the present invention, a vertical positioning device is provided which both vertically and horizontally uniformly positions electrical junction boxes on wall studs at an adjustable predetermined position relative to a wall stud. The electrical junction box installer comprises a positioning block, a vertical guide, two horizontal positioning plates, and a positioning handle. The positioning block is shaped on one side thereof to abut flush against the wall stud. An adjustable vertical guide is inserted through a vertical aperture in the positioning block and includes a base for abutting against a floor directly in front of the stud during wall box positioning. The positioning block is lockable relative to the vertical guide at a preselected vertical height by a locking screw.

Also connected to the positioning block are two horizontal positioning plates. Each of the plates is designed to hold a spring loaded clamping mechanism which easily and quickly receives an electrical junction box and such a box is accurately positioned relative to the block in accordance with the preselected horizontal adjustment of the associated plate. The plates are individually horizontally adjustable relative to the positioning block and either can be swung back out of the way if necessary where the box is being mounted on adjacent studs or another structure other than a standard stud.

In particular, the horizontal positioning plates are used to adjust the horizontal position of the electrical junction box relative to the surface of the wall to be installed.

The clamping mechanism comprises a pair of spring biased bands extending from each plate which are sized to be interferringly received in the interior of the box and thereafter bias against the interior to hold the box in place during installation. The springs allow an electrician to put a box on the clamping mechanism in a simple, single and very time efficient movement and likewise allow removal by simply pulling the installer toward the electrician after the box is secured to the stud.

PRINCIPLE OBJECTS OF THE PRESENT INVENTION

The principal objects of the present invention are: to provide a mechanism for the uniform positioning of electrical junction boxes on wall studs during building construction; to provide such a mechanism that allows a quick preselected standard placement of junction boxes above a floor; to provide such a mechanism that allows quick and easy horizontal placement of junction boxes so that such are in proper position relative to subsequent wall covering such as gypsum board; to provide such a mechanism that includes vertical and horizontal adjustment features so as to be quickly and easily adjusted to conform to varying electrical junction box positioning requirements; to provide such a mechanism that easily receives a box, holds the box in a predetermined vertical and horizontal position relative to a stud while nailing the box to the stud, and easily disengages from the box after the box is attached to a stud; to provide such a mechanism wherein the box is easily and quickly mounted on the mechanism using only one hand, leaving the other hand free to hold the mechanism; likewise, once the box is on the mechanism, only one hand is required to hold the mechanism and consequently the box in a very stable position against a stud while nailing; to provide such a mechanism which is economical to manufacture, easy to use and particularly adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
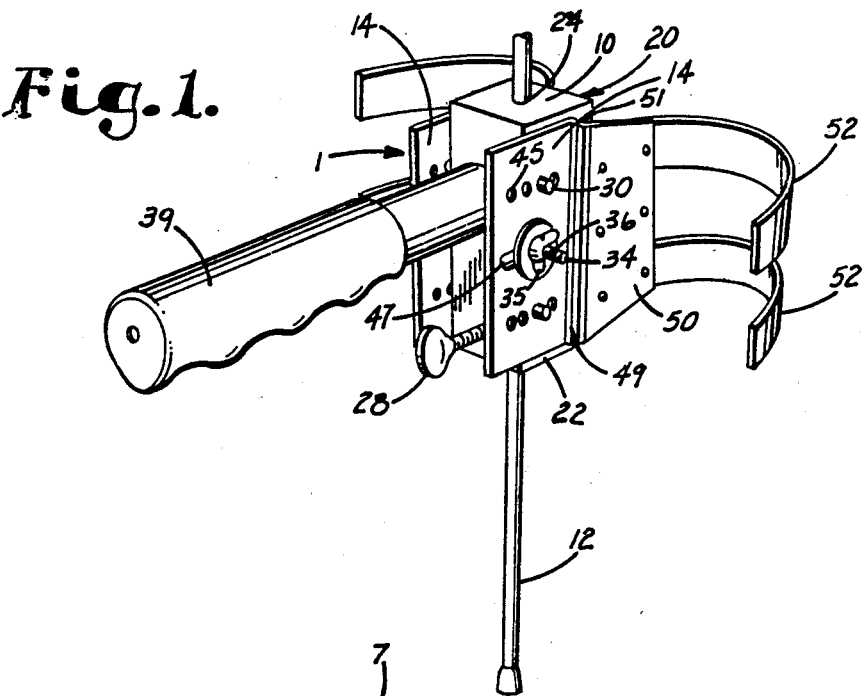
FIG. 1 is a perspective view of an electrical junction box installer, according to the present invention, showing a positioning block, a user handle, a vertical adjustment device, horizontal positioning plates with associated box retaining spring-like bands.
Figure 2:
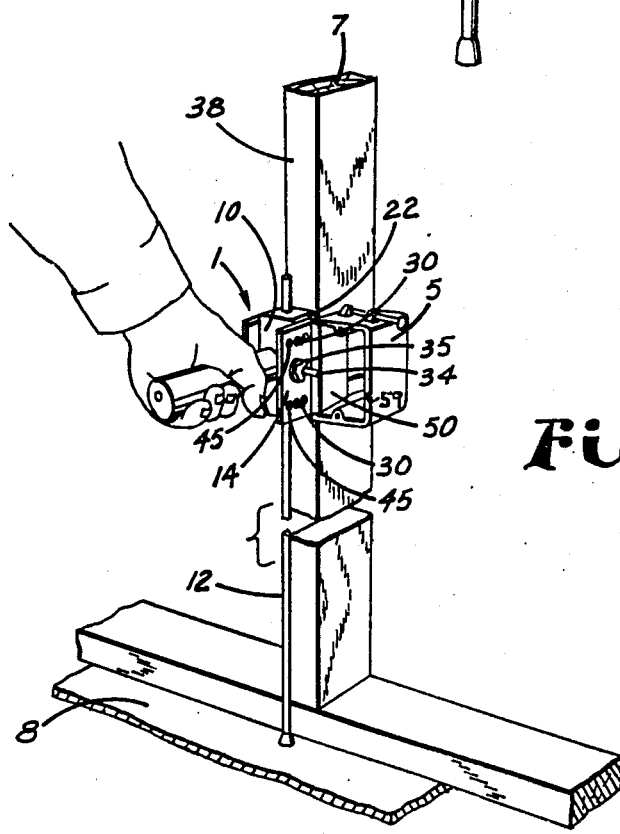
FIG. 2 is a perspective view of the electrical junction box installer on a reduced scale with the positioning block vertically and horizontally positioned relative to a floor on a stud and manually held flush against the stud, with the electrical outlet box supported by the bands on one of the horizontal positioning plates.
Figure 3:
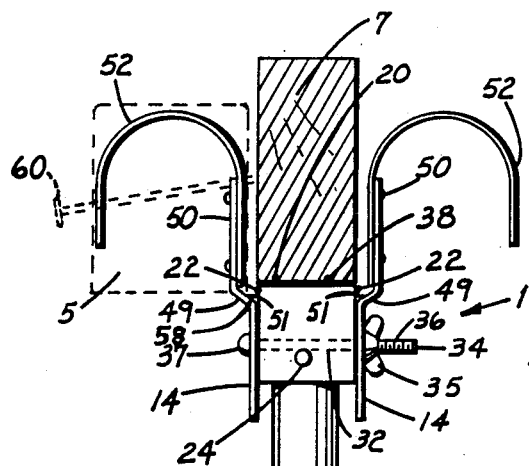
FIG. 3 is a top plan view of the electrical junction box installer showing the relative position between the positioning block, the stud, and the horizontal positioning plates, with an electrical junction box and securing nail shown in phantom.
Figure 4:
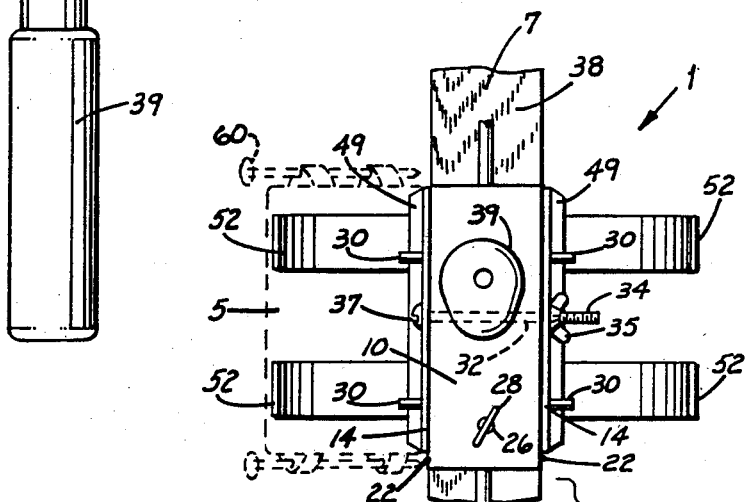
FIG. 4 is a front elevational view of the electrical junction box installer showing the vertical guide resting on a floor with the positioning block positioned against the stud and with an electrical outlet box and securing nails shown in phantom.
Figure 5:
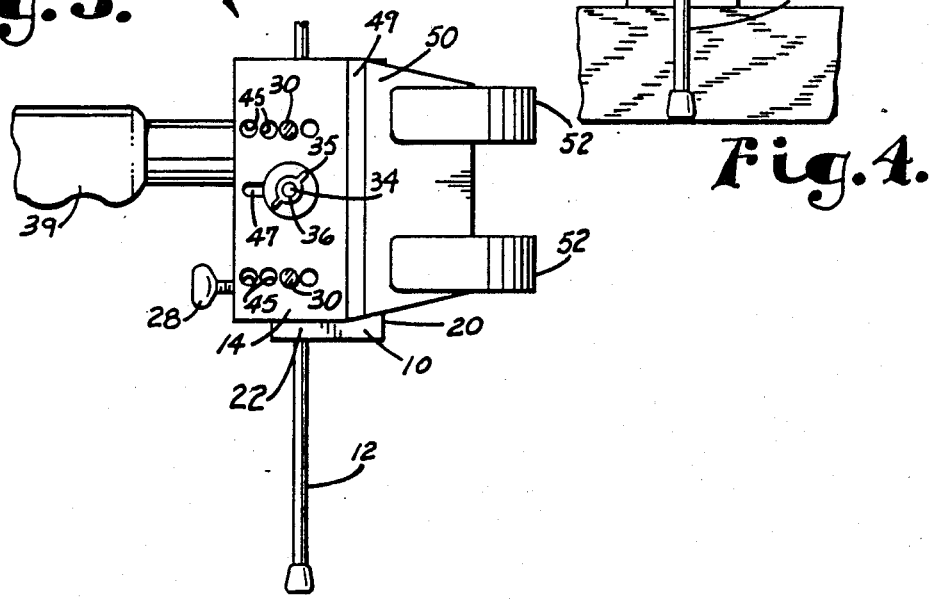
FIG. 5 is a side elevational view of the wall box installer.

As used herein, the term "front" refers to the lower left in FIG. 2.

The reference numeral 1 generally designates an electrical junction box installer 1 for the installation of an electrical junction box 5 on a wall stud 7 at some distance above a floor 8. The electrical junction box installer 1 comprises a support frame or positioning block 10, a vertical guide 12, and a pair of horizontal positioning plates 14.

The positioning block 10 includes thereon a vertically aligned stud abutting surface 20 and a pair of vertical plate abutment surfaces 22, a vertical aperture 24, a threaded adjustment aperture 26 for securing a locking screw 28, a pair of alignment stubs 30 extending outwardly from each vertical plate abutment surface 22, a horizontal aperture 32 through which is inserted a plate hold down bolt 34 having a securing nut 35 and a head 37, and a positioning handle 39.

The relative position between the vertical guide 12 and the positioning block 10 is adjusted by moving the vertical guide 12 through the vertical aperture 24 to a desired location. Once in the desired location, the relative position between the vertical guide 12 and the positioning block 10 can be fixed by tightening the locking screw 28 in the threaded adjustment aperture 26 against the guide 12. The longitudinal axis of the threaded aperture 26 is perpendicular to and intersects with the longitudinal axis of the vertical aperture 24. Upon tightening of the locking screw 28, the tip of the locking screw 28 abuts against and holds stationary the vertical guide 12 in the vertical aperture 24.

The handle 39 is fixedly attached to the positioning block 10 opposite the stud abutting surface 20 and is used to manually hold the vertical abutting surface 20 flush against a front face 38 of the wall stud 7 when securing a box 5 to the stud 7.

The positioning block 10 is constructed by forming a generally rectangular shape from any durable material and boring and threading the required apertures. The width of the vertical abutting surface 20 should preferably be the standard width of the front face of a standard wall stud. The planes of the vertical plate abutment surface 22 are at right angles to the plane of the vertical abutting surface 20. The plane of each of the vertical abutting surfaces 20, the longitudinal axis of the vertical aperture 24, and an imaginary line connecting the points of attachment of the alignment stubs 30 to one of the surfaces 22 are all parallel.

It is also foreseen that the positioning block 10 may be formed by folding a sheet of sufficiently thick and durable material, such as metal, to form the walls thereof with the appropriate apertures bored and threaded into such walls.

The horizontal positioning plates 14 have therein a plurality of horizontal plate position apertures 45 and a locking screw aperture 47. Further, each plate 14 is connected by a wall 49 to an offset junction box abutment portion 50 with a rear abutment 51 and a pair of box support means such as spring loaded junction box securing bands 52. A pair of equally spaced and linearly aligned sets of horizontal plate positioning apertures 45 are positioned in each horizontal positioning plate 14 and are vertically positioned so as to align with the pair of alignment stubs 30 on each vertical abutting surface 20. Each set of the apertures 45 are positioned so as to properly position the installer 1 for a particular wall thickness (for example, the apertures may be spaced for standard paneling, ¼" gypsum board, ⅜" gypsum board, ½" gypsum board and the like).

The electrical junction box 5 is placed on the offset junction box abutment portion 50 of the horizontal positioning plate 14 and held in a snug abutted position against the offset junction box abutment portion 50 by the spring loaded junction box securing bands 52. The bands 52 are constructed of any material having spring strength and are designed to interferringly be received in the box 5 so as to securely hold the box 5 due to the bands 52 being biased against the interior of the box 5. It is foreseen, however, that other means may be devised to hold the electrical junction box 5 in place on the installer 1 which, instead of springs, uses a rigid but adjustable mechanism.

The junction box vertical alignment surface 49 of the horizontal positioning plate 14 is held in a vertical position parallel to the vertical abutting surface 20 of the positioning block 10 by the positioning of a selected pair of horizontal plate positioning apertures 45 over the alignment stubs 30.

The wing nut 35 on the bolt 34 may be selectively loosened by the user to thereby loosen the plates 14 and allow the stubs 30 to be repositioned in different apertures 45 or to allow one of the plates 14 to be rotated so as to extend forward rather than rearward where the installer 1 is being utilized to attach a box 5 to multiple adjustment studs.

In operation, the junction box 5 is placed on the bands 52 of the horizontal positioning plate 14 such that the inside opening vertical edge 58 of the electrical junction box 5 abuts flush against the abutment 51 associated with a respective horizontal positioning plate 14. This horizontally secures the box 5 in a fixed horizontal and vertical position relative to the positioning block surface 20. If not in the desired position, the plane of the front face 59 of the electrical junction box 5 may be varied in its relationship to the front face 38 of the wall stud 7 by positioning the alignment stubs 30 into different horizontal plate positioning apertures 45.

The horizontal positioning plates 14 are held in the abutted position against the vertical abutting surface 20 of the positioning block 10 by the plate hold down bolt 34 and nut 35 when tightened. The vertical adjustment is preset by adjustment of the vertical guide 12. The distal end of the guide 12 is positioned on the floor in front of the stud 7, as seen in FIG. 2 and the surface 20 is held against the stud surface 38 by pushing on the handle 39. At this time, the user is able to drive the box nails 60 into the stud 7 while holding the box 5 stable with one hand.

Either horizontal positioning plate 14 may be reversed to allow for positioning of the positioning block 10 against an unusually thick stud or against two studs.

It is to be understood that while certain forms of the present invention have been illustrated and described herein, it is not to be limited to the specific forms or arrangement of parts described and shown.

What is claimed and desired to be secured by Letters Patent is as follows:

1. An electrical junction box installer for positioning electrical junction boxes on studs during construction of a wall above a floor; said installer comprising:
   (a) a central frame including a stud engaging surface;
   (b) vertical positioning means connected to said central frame for positioning and maintaining said central frame at a predetermined distance above the floor; and
   (c) junction box support means connected to said central frame for temporary support of an electrical junction box in a fixed position relative to said frame, said support means comprising spring means extending outwardly from said central frame and adapted to compressably fit at least partly within an electrical junction box for exerting outwardly-directed spring force against opposite surfaces within the junction box interior whereby the box is held by the spring means during installation and whereby the spring means can be withdrawn from the box after installation, said spring means having a compressed configuration extending between the junction box interior opposite surfaces.

2. An installer according to claim 1 including:
   (a) horizontal adjustment means to allow the selective horizontal adjustment of said box support means relative to said frame.

3. An installer according to claim 1 wherein said vertical positioning means comprises:
   (a) an aperture in said support frame that is vertically aligned when said installer is in an installing configuration thereof;
   (b) an elongate rod slidably received in said aperture and having a floor engageable distal end; and
   (c) locking means for securing said rod in a predetermined position relative to said frame.

4. An installer according to claim 3 wherein:
   (a) said vertical guide means comprises a shaft of a diameter slightly less than that of said vertical aperture; and
   (b) said locking means comprises a manually adjustable bolt.

5. An electrical junction box installer for positioning electrical junction boxes on studs during construction of a wall above a floor; said installer comprising:
   (a) a central frame including a stud engaging surface;
   (b) vertical positioning means connected to said central frame for positioning and maintaining said central frame at a predetermined distance above the floor;
   (c) junction box support means connected to said central frame for temporary support of an electrical junction box in a fixed positioned relative to said frame;
   (d) said stud engaging surface is generally vertical during an installing configuration of said installer and is of a width approximately that of a standard stud;
   (e) said frame including a plate abutment surface at a right angle to said stud abutment surface; and
   (f) said junction box support means comprises:
      (1) an electrical junction box positioning plate for holding said electrical junction box in position and which abuts against said plate abutment vertical surface;
      (2) positioning plate alignment means for horizontal adjustment of said plate; and
      (3) plate securing means for selectively securing said positioning plate to said frame and in a fixed preselected horizontal position relative to said plate abutment surface.

6. An installer according to claim 5 wherein:
   (a) said plate is a first plate and including a second plate on an opposite side of said frame; said second plate having box holding and positioning means associated therewith.

7. An installer according to claim 5 wherein said positioning plate alignment means comprises:
   (a) a pair of alignment stubs vertically aligned on and fixedly attached to a first of said plate abutment surface of said positioning means or said plate; said alignment stubs protruding at right angles from a plane of said plate abutment vertical surface for positioning said plate; and
   (b) multiple pairs of vertically spaced apertures in a second of said plate abutment surface or positioning plate sized to receive said stubs to removably position said plate horizontally relative to said frame.

8. An installer according to claim 5 wherein said plate securing means comprises:
   (a) a bolt with a manually adjustable fastener;
   (b) horizontal apertures in said frame and in said plate shaped to receive said bolt; and (c) said bolt being positioned through said apertures and allowing said plate to be moved horizontally relative to said frame when the fastener thereof is loosened.

9. An electrical junction box installer according to claim 5 wherein said positioning plate includes:
(a) a vertical offset portion attached to said positioning plate by a vertical for supporting said electrical junction box on said positioning plate and said offset portion supports said box support means.

10. An electrical junction box installer for positioning electrical boxes on studs during construction of a wall above a floor; said installer comprising:
(a) a central frame including a stud engaging surface that is generally vertically aligned when said installer is in an installing configuration thereof;
(b) vertical positioning means connected to said central frame for positioning and maintaining said central frame at a predetermined distance above the floor;
(c) junction box support means connected to said central frame for temporary support of an electrical junction box in a fixed position relative to said frame; said support means including a pair of spring devices on either side of said frame for interferingly being held in a box; and
(d) horizontal adjustment means to allow the selective horizontal adjustment of said box support means relative to said frame.

11. An electrical junction box installer for positioning electrical junction boxes on studs during construction of a wall above a floor; said installer comprising:
(a) a central frame including a stud engaging surface;
(b) vertical positioning means connected to said central frame for positioning and maintaining said central frame at a predetermined distance above the floor; and
(c) junction box support means connected to said central frame for temporary support of an electrical junction box in a fixed position relative to said frame, said support means comprising spring-like bands which extend outwardly relative to said frame; said bands being sized so as to interferingly fir into a box such that the box is held by said bands during installation and such that said bands can thereafter be easily pulled from the box.

* * * * *